United States Patent
Gratke et al.

(10) Patent No.: US 8,054,990 B2
(45) Date of Patent: Nov. 8, 2011

(54) METHOD OF RECOGNIZING SPEECH FROM A PLURALITY OF SPEAKING LOCATIONS WITHIN A VEHICLE

(75) Inventors: Jesse T. Gratke, Royal Oak, MI (US); Rathinavelu Chengalvarayan, Naperville, IL (US)

(73) Assignee: General Motors LLC, Detroit, MI (US)

( * ) Notice: Subject to any disclaimer, the term of this patent is extended or adjusted under 35 U.S.C. 154(b) by 1384 days.

(21) Appl. No.: 11/562,853

(22) Filed: Nov. 22, 2006

(65) Prior Publication Data

US 2008/0118080 A1    May 22, 2008

(51) Int. Cl.
*H04R 3/00* (2006.01)

(52) U.S. Cl. ............ 381/92; 381/86; 381/122; 381/123; 704/246

(58) Field of Classification Search .................. 381/302, 381/92, 110, 11, 122, 123, 337, 26, 95, 312, 381/313, 91, 1, 2, 5, 10, 15, 17–22, 300, 381/307, 27, 59, 61–62, 77–80, 86–87, 89, 381/332, 334, 336, 106; 704/232, 246, 248, 704/208, 214, E17.002
See application file for complete search history.

(56) References Cited

U.S. PATENT DOCUMENTS

| | | | | |
|---|---|---|---|---|
| 2,852,620 A * | 9/1958 | Kusters et al. | ................. | 381/358 |
| 4,827,520 A * | 5/1989 | Zeinstra | ............................. | 701/1 |
| 5,313,514 A * | 5/1994 | Kanasashi | ....................... | 455/570 |
| 5,757,933 A * | 5/1998 | Preves et al. | ................... | 381/313 |
| 7,369,664 B2 | 5/2008 | Kargus, IV et al. | | |
| 7,454,352 B2 | 11/2008 | Bicego et al. | | |
| 7,526,284 B2 | 4/2009 | Gryc | | |
| 2004/0028239 A1 * | 2/2004 | Watson et al. | ................... | 381/86 |
| 2004/0107097 A1 | 6/2004 | Lenane et al. | | |
| 2004/0209653 A1 | 10/2004 | Chandhok | | |
| 2004/0235530 A1 | 11/2004 | Arun | | |
| 2005/0049859 A1 | 3/2005 | Arun | | |
| 2005/0135642 A1 * | 6/2005 | Dry | ............................... | 381/302 |
| 2005/0187763 A1 | 8/2005 | Arun | | |
| 2005/0221852 A1 * | 10/2005 | D'Avello et al. | ............. | 455/518 |
| 2006/0074651 A1 | 4/2006 | Arun | | |
| 2006/0135215 A1 | 6/2006 | Chengalvarayan et al. | | |
| 2007/0136063 A1 | 6/2007 | Grost et al. | | |
| 2007/0136069 A1 | 6/2007 | Veliu et al. | | |
| 2007/0174055 A1 | 7/2007 | Chengalvarayan et al. | | |
| 2007/0177752 A1 * | 8/2007 | Kargus, IV | ................... | 381/357 |
| 2007/0211880 A1 | 9/2007 | Ross et al. | | |

FOREIGN PATENT DOCUMENTS

JP         2000050385 A  *  2/2000

* cited by examiner

*Primary Examiner* — Vivian Chin
*Assistant Examiner* — Leshui Zhang
(74) *Attorney, Agent, or Firm* — Anthony L. Simon; Reising Ethington P.C.

(57) ABSTRACT

A speech recognition method includes the steps of receiving a location-specific command from a vehicle occupant, and adjusting either the shape or magnitude of a pick up pattern of at least one microphone in response to the location-specific command. The microphone adjustment can be carried out by electronically or physically steering the pick-up pattern.

12 Claims, 5 Drawing Sheets

METHOD OF RECOGNIZING SPEECH FROM A PLURALITY OF SPEAKING LOCATIONS WITHIN A VEHICLE

TECHNICAL FIELD

This invention relates to speech signal processing and, more particularly, to speech recognition within a vehicle equipped with automated speech recognition (ASR).

BACKGROUND OF THE INVENTION

ASR technology enables microphone-equipped computing devices to interpret speech and thereby provide an alternative to conventional human-to-computer input devices such as keyboards or keypads. For example, vehicle telecommunications devices can be equipped with voice dialing features enabled by an ASR system. The ASR system typically includes a microphone to receive speech from an occupant of a vehicle.

The microphone is usually located in a forward portion of a passenger compartment of the vehicle such as in a rear view mirror assembly. Such a forward mounted microphone is satisfactory to enable reliable recognition of speech from a driver. But the forward mounted microphone may not be satisfactory to enable reliable recognition of speech from other passengers in front and rear seating positions.

Accordingly, some ASR systems deploy a plurality of individual microphones in a vehicle interior; with one microphone and associated pushbutton located at each seating position. But this approach unnecessarily adds cost and complexity to the ASR system.

SUMMARY OF THE INVENTION

According to one aspect of the present invention, there is provided a method of recognizing speech from a plurality of speaking locations within a vehicle, comprising:

receiving a location-specific command from a vehicle occupant; and adjusting at least one of a shape or magnitude of a pick up pattern of at least one microphone in response to the location-specific command.

The speech recognition method may also include one or more of the following additional steps:

steering the pick up pattern of the at least one microphone in response to the location-specific command; or adjusting output of at least one loudspeaker in the vehicle in response to the location-specific command.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
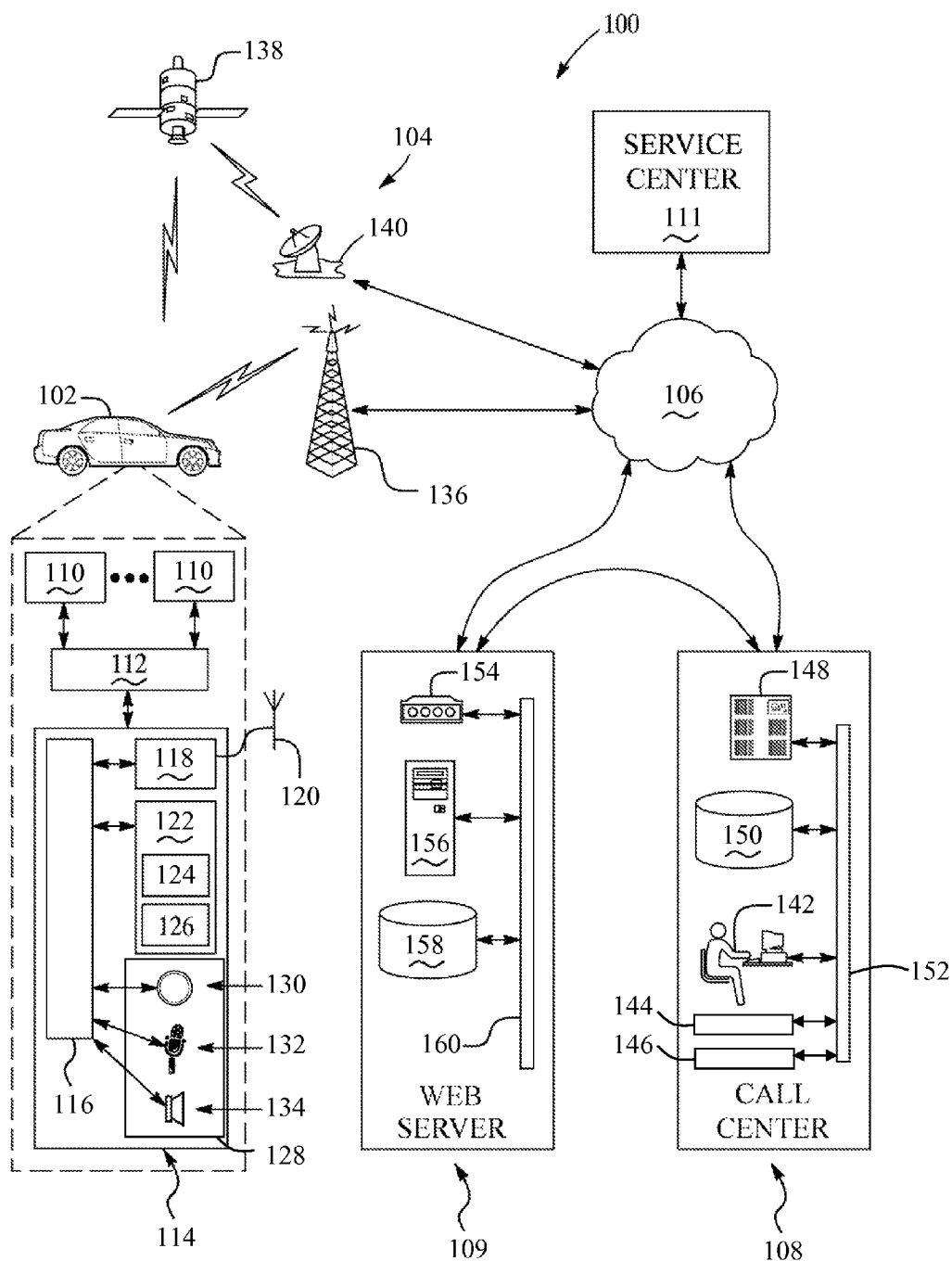
FIG. 1 is a block diagram depicting an example of a telematics system that can be used to implement exemplary methods of speech recognition.
Figure 2:
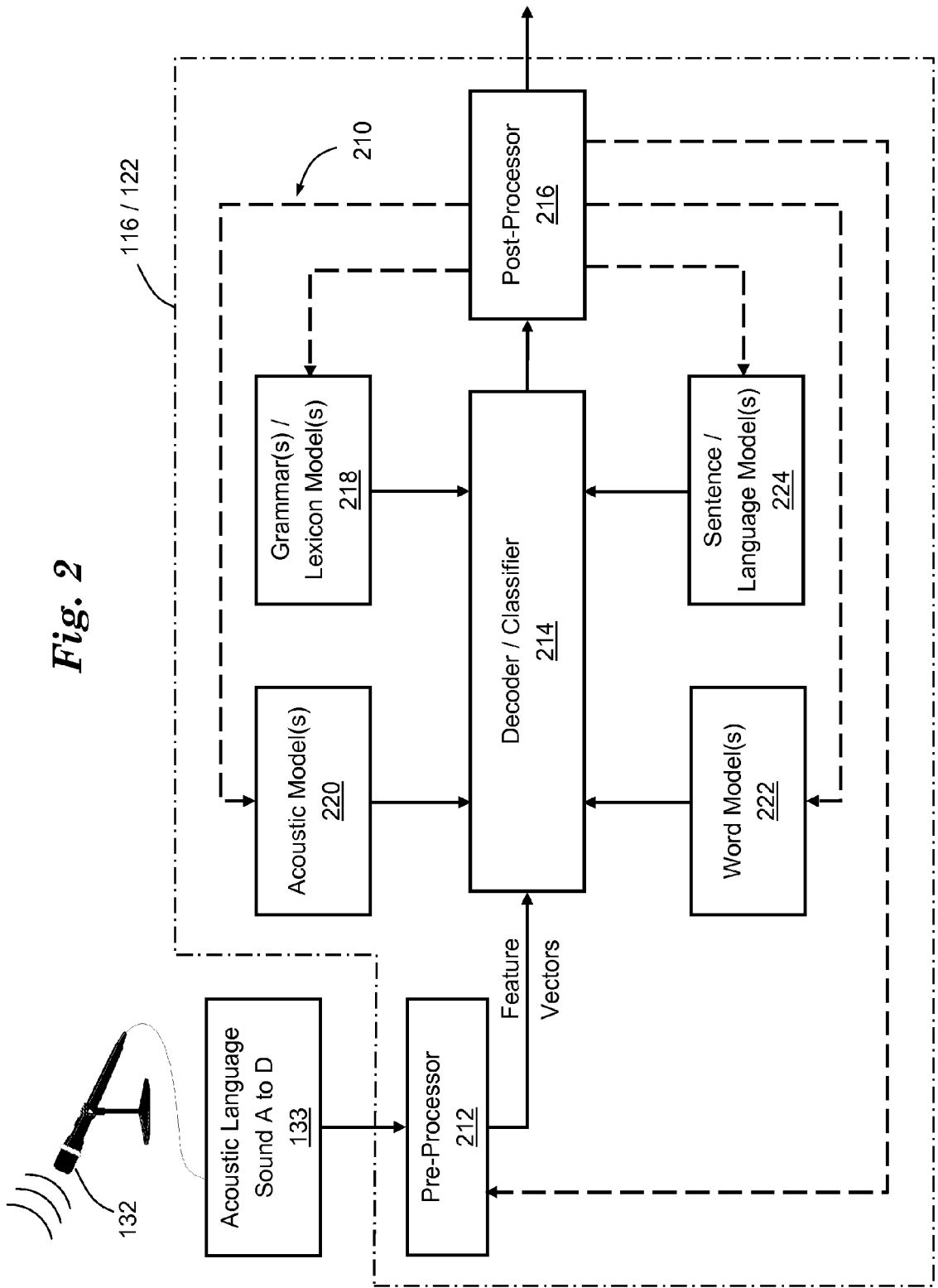
FIG. 2 is a block diagram illustrating an example ASR architecture that can be embedded within the telematics system of FIG. 1 and used to implement exemplary methods of speech recognition.

An exemplary operating environment enabled with automated speech recognition (ASR) is illustrated in FIGS. 1 and 2, and can be used to implement the illustrated embodiments of speech recognition methods. These methods can be particularly useful for voice dialing applications, voice activated web browsing applications, or the like. The methods can include speech recognition generally and improved applications of speech recognition, and are discussed in detail further below in conjunction with FIGS. 3 through 9.

The methods can be carried out using any suitable ASR-enabled system. Preferably, however, the methods are carried out in conjunction with an ASR-enabled telematics system such as the illustrated system 100, which can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with the aforementioned elements to provide services to the vehicle 102.

The exemplary telematics system 100 generally facilitates numerous services to the occupant(s) of the vehicle 102, including vehicle navigation, turn-by-turn driving directions, telephony including automated audio interaction with the occupant, emergency services, vehicle diagnostics, vehicle system updates, and ASR. For this purpose the telematics system 100 processes data and instructions as well as facilitates wireless voice and data transfer between hardware located on the vehicle 102 and hardware in the remote call center 108. For example, the telematics system 100 enables the vehicle occupant to initiate voice communication, for example, with the call center 108 or the service center 111. Also, the telematics system 100 enables electronic communication between the vehicle 102 and the web server 109 for various purposes such as transmitting and/or receiving information such as updated voice messages, email, news, or the like.

Motor Vehicle

The motor vehicle 102 is depicted in the illustrated embodiment as a passenger vehicle, and it will be appreciated that any other mobile vehicles including marine vehicles, aircraft, and other automobiles such as vans, trucks, etc., can be used without departing from the scope of the invention. Various electronic modules can be located on the vehicle 102 and include one or more vehicle sub-systems or vehicle system modules (VSMs) 110, an on-board vehicle communication bus 112, and one or more vehicle telematics units 114 connected by the bus 112 to the VSMs 110.

VSMs

The VSMs 110 facilitate suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent all of the subsystems throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSMs 110 and the telematics unit 114 and uses any suitable network communication configuration, such as a Controller Area Network (CAN), Media Oriented System Transport (MOST), Local Interconnect Network (LIN), Ethernet (10baseT, 100baseT), Local Area Network (LAN), ISO Standard 9141, ISO Standard 11898 for high-speed applications, ISO Standard 11519 for lower speed applications, SAE Standard J1850 for high-speed and lower speed applications, and/or the like.

Vehicle Telematics Unit

The vehicle telematics unit 114 facilitates communication and interactivity between the vehicle 102 or occupant thereof, and various remote locations including the call center 108, web server 109, and/or and service center 111. The telematics unit 114 interfaces with the various VSM's 110 via the vehicle communication bus 112. The telematics unit 114 can be implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122, such as to carry out various functions of monitoring and processing data and communicating the telematics unit 114 with the VSM's 110, vehicle occupants, and remote locations. For example, the processor 116 executes one or more speech recognition programs and process speech recognition data to carry out ASR. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 can be any electronic storage device that provides computer-readable storage of data and programs for use by the processor 116. The memory 122 can include volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 are used for monitoring, recognizing, and/or recording utterances or speech from a vehicle occupant via the user interface 128. The database 126 is used to store voice message data, diagnostic trouble code data, or other diagnostic data. For example, the database 126 includes speech recognition databases such as acoustic models, vocabularies, grammars, and the like. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular satellite, or other wireless path, and facilitates both voice and data communications. For example, the wireless communications device 118 and associated antenna 120 transmits and receives voice and data to and from the wireless communication system 104 so that the telematics unit 114 can communicate with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as CDMA or GSM, but could also utilize proprietary or other wireless technologies to communicate with the wireless communication system 104. Although shown as a separate component, communication device 118, or portions thereof, can be implemented through software using microprocessor 116; for example, a modem used for wireless cellular communication can be implemented in this manner. The wireless communications device 118 can include additional or integrated functionality such as satellite communications software and hardware including a global positioning system (GPS) receiver. Such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and can include a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows a vehicle occupant to provide voice commands or other verbal input into the telematics unit 114, as well as voice communication with various remote locations via the communications device 122. Voice commands from the vehicle occupant can be interpreted using a suitable analog-to-digital interface or digital signal processor such as a sound card (not shown) between the microphone 132 and the processor 116 and voice recognition programs and data stored within the memory 122.

The output devices can include one or more speakers 134, a visual display device such as a liquid crystal or plasma screen (not shown), or any other types of output devices. The speaker(s) 134 enable the telematics unit 114 to communicate with the vehicle occupant through audible speech, signals, or audio files, and can be stand-alone speakers specifically dedicated for use with the telematics unit 114, or they can be part of the vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 can include an analog or digital cellular network 136, a wireless computer network such as a wide area network (not shown), or any other suitable wireless network used to transmit voice and data signals between the vehicle 102 and various remote locations such as the call center 108 and/or service center 111. In one embodiment, the cellular network 136 is implemented as a CDMA, GSM, or other cellular communication network that exchanges voice and data between the vehicle 102 and the second communication system 106. Additionally or alternatively, wireless communication can be carried out by satellite transmission using one or more satellites 138 to connect the vehicle 102 to the second communication system 106 via a central, ground-based satellite transceiver 140.

The second communication system 106 can be another wireless communication system or can be a land-based wired system such as a public switched telephone network (PSTN), an Internet Protocol (IP) network, an optical network, fiber network, or other cable network, and/or any combination of the aforementioned examples, any of which can be used for voice and/or data communication. Those skilled in the art will recognize that the communication systems 104, 106 can be implemented separately or can be combined as an integral system.

Call Center

The call center 108 includes one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer(s) used by the one or more advisors 142. For example, the servers 148 and databases 150 execute and store one or more speech recognition programs and speech recognition data to carry out ASR, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables a vehicle occupant to access websites and other content over the Internet, all from the vehicle using automated speech recognition technology and text-to-voice technology such as VoiceXML, or the like. For example, a vehicle occupant can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupant via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158 via the communication systems 104, 106. The web server 109 also communicates with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that a vehicle occupant can initiate a telephone call with a technician or service scheduler at the service center 111.

Exemplary ASR System

In general, a human user vocally interacts with an automatic speech recognition system for one or more fundamental purposes: to train the system to understand the user's voice; to store discrete speech such as a spoken nametag or a spoken control word like a numeral or keyword; or to use the recognition system to have the user's speech recognized and used for some useful end purpose such as voice dialing, menu navigation, transcription, or the like. In general, ASR extracts acoustic data from human speech, compares/contrasts the acoustic data to stored subword data, selects an appropriate subword which can be concatenated with other selected subwords, and outputs the corresponding subwords or words for post-processing such as dictation or transcription, address book dialing, storing to memory, training ASR models or adaptation parameters, or the like.

ASR systems are generally known to those skilled in the art, and FIG. 2 illustrates an exemplary specific architecture for an ASR system 210 that can be used to implement the method described below. The system 210 includes a device to receive speech such as the telematics microphone 132 and an acoustic interface 133 such as the telematics soundcard to digitize the speech into acoustic data. The architecture 210 also includes a memory such as the telematics memory 122 for storing the acoustic data and storing speech recognition software and databases, and a processor such as the telematics processor 116 to process the acoustic data. The processor 116 uses the speech recognition databases, a front-end processor or pre-processor software module 212 for parsing streams of the acoustic data of the speech into parametric representations such as acoustic features, a decoder software module 214 for decoding the acoustic features to yield digital subword or word output data corresponding to the input speech utterances, and a post-processor software module 216 for using the output data from the decoder module 214 for any suitable purpose.

One or more modules or models are used as input to the decoder module 214. First, grammar or lexicon model(s) 218 provide rules governing which words can logically follow other words to form valid sentences. In a broad sense, a grammar also defines a universe of vocabulary the system expects at any given time in any given ASR mode. For example, if the system 210 is in a training mode for training commands, then the grammar model(s) 218 can include all commands known to and used by the system 210. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) can define a universe of sentences the system expects at any given time in any given ASR mode and/or can provide rules governing which sentences can logically follow other sentences to form valid extended speech.

According to an alternative exemplary embodiment, some or all of the ASR system 210 can be resident on, and processed using, computing equipment in a location remote from the vehicle 102, such as the call center 108, web server 109, or the like. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software such as HMM decoders can be processed using processors of one of the servers 148 in the call center 108. In other words, the ASR system 210 can be distributed across the call center 108 and the vehicle 102 in any desired manner. Likewise, the methods described herein can be carried out entirely by the telematics unit 114 of the vehicle 102, by the computing equipment in the call center 108, or by any combination thereof.

Extracting Acoustic Data

First, acoustic data is extracted from human speech wherein a user speaks into the microphone 132, which converts the utterances into electrical signals and communicates such signals to the acoustic interface 133. A sound-responsive element in the microphone 132 captures the user's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into streams of digital data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digitized speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the user's speech, such as time-varying feature vectors, from within each frame. Utterances within the user's speech can be represented as sequences of these feature vectors. For example, and as known to those skilled in the art, feature vectors can be extracted and can include, for example, vocal pitch, energy profiles, and/or spectral attributes, or cepstral coefficients that are obtained by performing Fourier transforms of the frames and decorrelating acoustic spectra using cosine transforms. Thus, an unknown test pattern of speech is a concatenation of related acoustic frames and corresponding parameters covering a particular duration of speech.

Decoding

Third, the processor executes the decoder module 214 to process the incoming feature vectors of each test pattern. The decoder module 214 is also known as a recognition engine or classifier and uses stored known reference patterns of speech. Like the test patterns, the reference patterns are defined as a concatenation of related acoustic frames and corresponding parameters. The decoder module 214 compares and contrasts the acoustic feature vectors of a subword to be recognized with stored subword models or patterns, assesses the magnitude of the differences or similarities therebetween, and ultimately uses decision logic to choose a best matching subword from the models as the recognized subword. The best matching subword is typically that which corresponds to the stored known reference pattern that has the minimum dissimilarity to, or highest probability of being, the test pattern.

Recognized subwords can be used to construct words with help from the word models 222 and to construct sentences with the help from the language models 224. The decoder module 214 can use various techniques known to those skilled in the art to analyze and recognize subwords, including but not limited to dynamic time-warping classifiers, artificial intelligence techniques, neural networks, free phoneme recognizers, and probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword, such as by the application of Bayes' Theorem. A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMM's for a sequence of subwords can be concatenated to establish word HMM's.

The speech recognition decoder 214 processes the feature vectors using the appropriate acoustic models, grammars, and algorithms to generate an N-best list of nametag templates. As used herein, the term templates is interchangeable with models, waveforms, reference patterns, rich signal models, exemplars, hypotheses, or other types of references. A template can include a series of feature vectors representative of a word or subword and can be based on particular speakers, speaking styles, and audible environmental conditions. Those skilled in the art will recognize that templates can be generated by suitable template training of the ASR system and stored in memory. Those skilled in the art will also recognize that stored templates can be manipulated, wherein parameter values of the templates are adapted based on differences in speech input signals between template training and actual use of the ASR system. For example, a set of templates trained for one ASR user or certain acoustic conditions can be adapted and saved as another set of templates for a new ASR user or new acoustic conditions, based on a limited amount of training data from the new user or the new acoustic conditions. In other words, the templates are not necessarily fixed and can be processed during speech recognition.

Using the in-vocabulary grammar and any suitable decoder algorithm(s) and acoustic model(s), the processor accesses from memory several templates interpretive of the spoken command. For example, the processor can generate, and store to memory, a list of N-best vocabulary results or templates, along with corresponding parameter values. Exemplary parameter values can include confidence scores of each template in the N-best list of vocabulary and associated segment durations, likelihood scores, signal-to-noise (SNR) values, and/or the like. The N-best list of vocabulary can be ordered by descending magnitude of the parameter value(s). For example, the vocabulary template with the highest confidence score is the first best template, and so on.

Post-Processing

The post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212, or the like.

Method of Speech Recognition

A method of recognizing speech from a plurality of locations within a vehicle is provided herein and can be carried out as one or more computer programs using the architecture of the ASR system 210 within the operating environment of the telematics system 100 described above. Those skilled in the art will also recognize that the method can be carried out using other ASR systems within other operating environments.

In general, the method is provided to improve speech recognition performance by enabling an in-vehicle microphone to respond differently to speech emanating from different locations within the vehicle. The microphone is a directional microphone capable of changing the shape and/or magnitude of its acoustic pickup pattern to pick up speech from a front or rear seating location within the vehicle. The microphone is also capable of changing an orientation of its pickup pattern to pick up speech from a left, center, or right side of the vehicle. In other words, characteristics of the microphone can be changed to respond to speech emanating from front or rear seating positions of a vehicle and/or to left and right sides and center of the vehicle. Ultimately, the speech recognition techniques according to the present methods improve speech recognition accuracy and speed. Before discussing embodiments of the method in detail, a brief overview of a directional microphone for use with the method is presented below.

A microphone is generally an electroacoustic device including a transducer that converts sound pressure waves to electrical signals. Common microphones include pressure microphones and pressure-gradient microphones. Pressure microphones produce electrical signals based on variations in sound pressure received at one side of the transducer, and are inherently nondirectional because pressure is a scalar and not a vector quantity. Pressure-gradient microphones produce electrical signals based on a function of a difference in pressure between opposite sides of the transducer.

An electret microphone can be a pressure or pressure-gradient microphone and includes an electret transducer. The electret transducer includes a first electrode closely facing a second electrode with a narrow air gap therebetween. The first electrode is a perforated rigid metal backplate, and the second electrode is a flexible diaphragm (or electret). The diaphragm includes an insulating material on one surface facing the first electrode to trap electrical charges, and a metal coating on an opposite surface. The diaphragm is electrically charged and deflects upon exposure to sound waves. The deflections proportionally translate into differentials in electrical output signals between the backplate and the metal surface of the diaphragm.

FIGS. 3 through 8 illustrate diagrams of pickup patterns of various types of electret microphones, wherein a top of each polar diagram represents a front of a microphone and a bottom represents a rear of the microphone. A microphone's pickup pattern is an indication of sensitivity to speech arriving at different angles about a central axis of the microphone. In other words, a microphone pickup pattern is an indication of the directionality or directivity of the microphone. Microphones can be designed to have different pickup patterns, including omnidirectional, unidirectional, bidirectional, and cardioid types of patterns.

Figure 3:
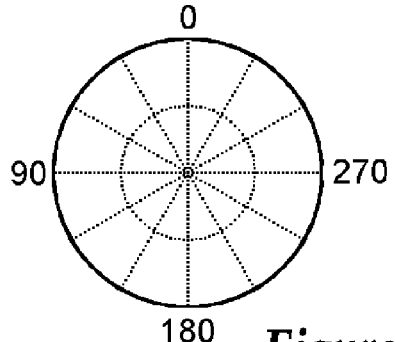
FIG. 3 is a polar directivity diagram illustrating a pickup pattern of an omnidirectional microphone.

FIG. 3 depicts a pickup pattern of an omnidirectional or monopole microphone, which picks up speech well from all directions (360°). The omnidirectional mic is typified by single port/cavity pressure microphones that produce output voltage proportional to air pressure. FIG. 3 also indicates an exemplary directivity index of 0.0 dB.

The directivity index (DI) of a microphone is a measure of its resistance to diffuse noise. When a microphone is surrounded by diffuse noise and speech at the same acoustic level, the DI indicates a reduction in the measured noise. For example, a microphone with a DI of 6 dB will decrease the measured acoustic noise by 6 dB. In other words, the DI represents a difference between microphone sensitivity to sounds at a given frequency arriving from the front compared to sounds of the same frequency arriving from all other directions. As shown in FIG. 3, the omnidirectional microphone in a diffuse field has a DI of 0.0 dB, because its sensitivity is the same for all directions.

Figure 4:
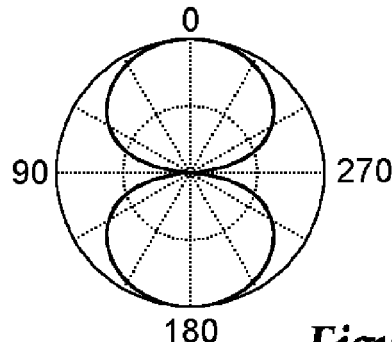
FIG. 4 is a polar directivity diagram illustrating a pickup pattern of a dipole microphone.

FIG. 4 illustrates a directivity pattern of a bipole type of bidirectional microphone, which picks up speech well from opposite directions (180° apart). The bidirectional mic is typified by opposed dual port/cavity pressure-gradient microphones that produce output voltage proportional to a difference in front and rear air pressure. The bipole mic has a single pair of sound ports including a front (positive) and a rear (negative) port. Thus, a sound wave arriving from the rear will yield a signal with a polarity opposite that of an identical sound wave from the front. An exemplary DI is shown as 4.8 dB.

Figure 5:
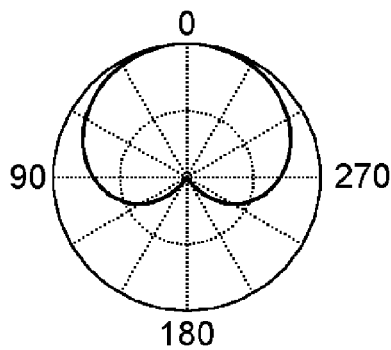
FIG. 5 is a polar directivity diagram illustrating a pickup pattern of a cardioid microphone.
Figure 5A:
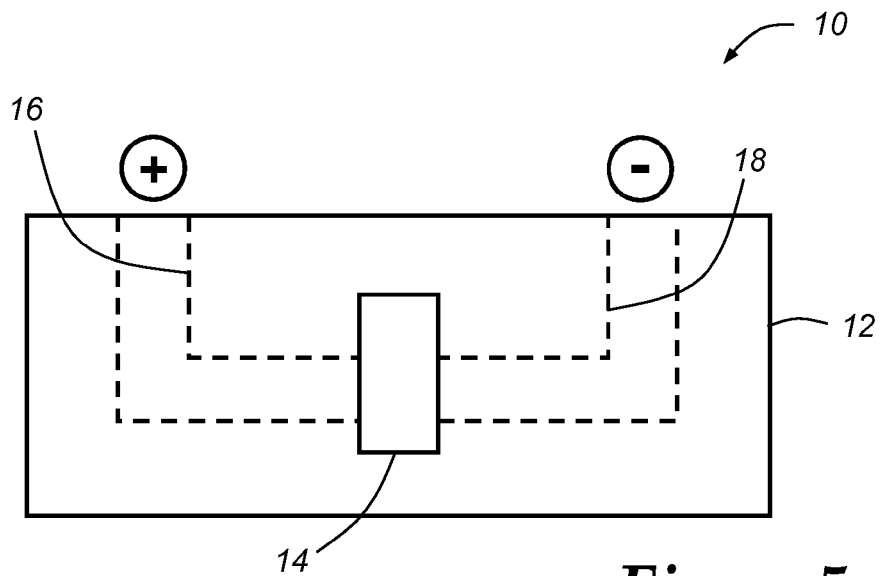
FIG. 5A is a schematic view of a cardioid microphone.

FIG. 5 shows a directivity pattern of a cardioid microphone, which generally picks up speech broadly from one direction and effectively represents the sum of a monopole superimposed over bipole type of microphone. FIG. 5A schematically illustrates a cardioid microphone 10 including a housing 12, an electret transducer 14 carried within the housing 12, and a pair of front and rear sound ports 16, 18 in communication between the air outside of the housing 12 and the transducer 14. For rear sounds, the negative polarity signal from the bipole cancels the corresponding signal from the monopole, and for front sounds the positive polarity signal from the bipole adds to the corresponding signal from the monopole, thereby resulting in a somewhat heart shaped response pattern. Accordingly, the cardioid microphone 10 has a nearly uniform response over a range of about 180° from the front, and a minimal response from the rear. An exemplary DI for the cardioid microphone 10 is 4.8 dB.

Figure 6:
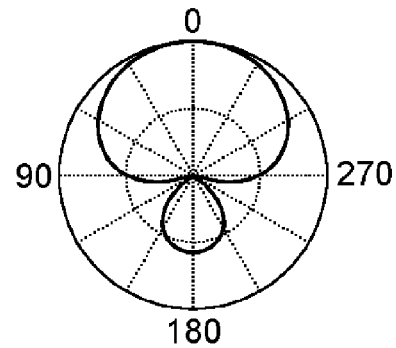
FIG. 6 is a polar directivity diagram illustrating a pickup pattern of another cardioid microphone.

FIG. 6 illustrates a directivity pattern of a biased, or less directional, cardioid type of microphone. The biased bidirectional mic is modified to emphasize one side of the mic over the other side, either by electrical signal processing, relative sizing of the sound ports, or both. An exemplary DI is 5.9 dB.

Figure 7:
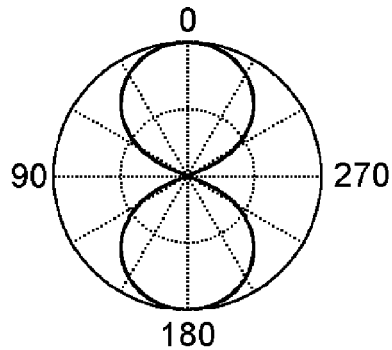
FIG. 7 is a polar directivity diagram illustrating a pickup pattern of an quadrupole microphone.

FIG. 7 illustrates a directivity pattern of a quadrupole type of bidirectional microphone, which picks up speech well from opposite directions (180° apart). In order to make a cardioid microphone even more directional, more ports can be added to the mic. The concept of adding ports to a microphone is based on a theory of multi-pole expansion, which holds that desired directivity can be achieved by adding monopoles, dipoles, and/or quadrupoles together. The quadrupole bidirectional mic is similar to the bipole mic but includes two pairs of sound ports that basically amount to a longitudinal quadrupole. An exemplary DI is 7.0 dB.

Figure 8:
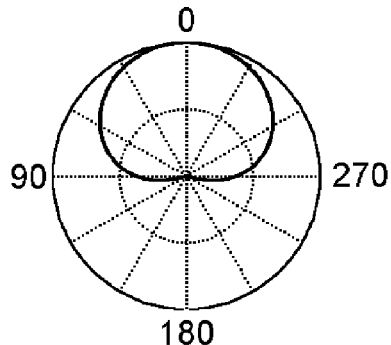
FIG. 8 is a polar directivity diagram illustrating a pickup pattern of a hypercardioid microphone.
Figure 8A:
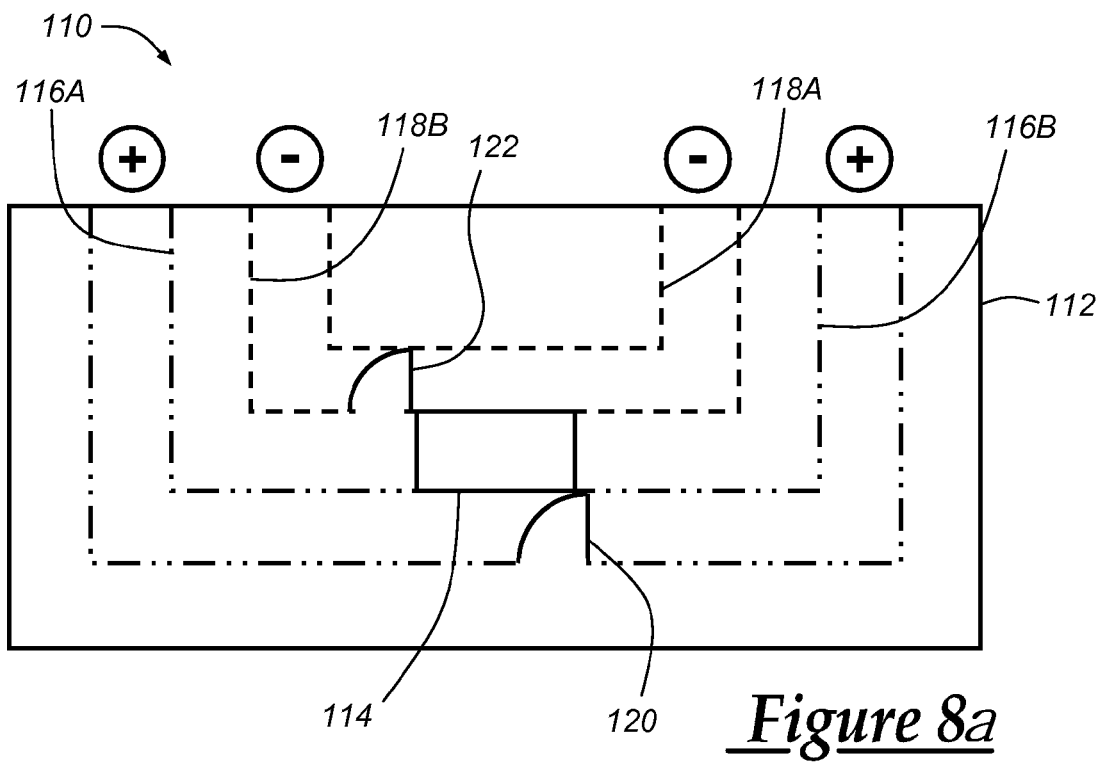
FIG. 8A is a schematic view of a hypercardioid microphone.

FIG. 8 illustrates a directivity pattern of a hypercardioid type of microphone that is similar to the cardioid mic, but effectively represents the sum of the biased cardioid superimposed over the quadrupole. FIG. 8A schematically illustrates a hypercardioid microphone 110 including a housing 112, an electret transducer 114 carried within the housing 112, and two pairs of front and rear sound ports 116A, 118A and 116B, 118B in communication between the air outside the housing 112 and the transducer 114. The shape of the pickup pattern from the hypercardioid mic 110 is different from that of the cardioid mic 10. For example, rear lobes of the hypercardioid pattern are less pronounced than rear lobes of the cardioid pattern. Also, the magnitude of the pickup pattern from the hypercardioid mic 110 is different from that of the cardioid mic 10. For instance, an exemplary DI of the hypercardioid mic 110 is 7.1, which is significantly greater than the DI of the cardioid mic.

As an example of pickup pattern reach, a microphone with a DI of about 4 to 7 dB, like the exemplary cardioid mic, will generally enable reliable recognition of speech within about 13 to 22 inches of a human speaker when installed in a vehicle. The pickup pattern reach can be extended by using a more directive microphone with a higher DI, such as the exemplary hypercardioid mic. Assuming the microphones are otherwise equal, the DI of the hypercardioid mic is greater than the DI of the cardioid mic. Therefore, the hypercardioid mic can reliably pick up sound from a distance further away than the cardioid.

In fact, a microphone installed in a rear view mirror with a sufficiently high DI can pick up sound from vehicle passengers in rear seating positions. For example, a microphone with a DI of about 7 to 9 dB, like the exemplary hypercardioid mic, will generally enable reliable recognition of speech within about 22 to 30 inches of a human speaker when installed in a vehicle. Microphones with higher than a 9 dB DI can also be used to extend the pickup pattern reach even further if desired.

Figure 9:
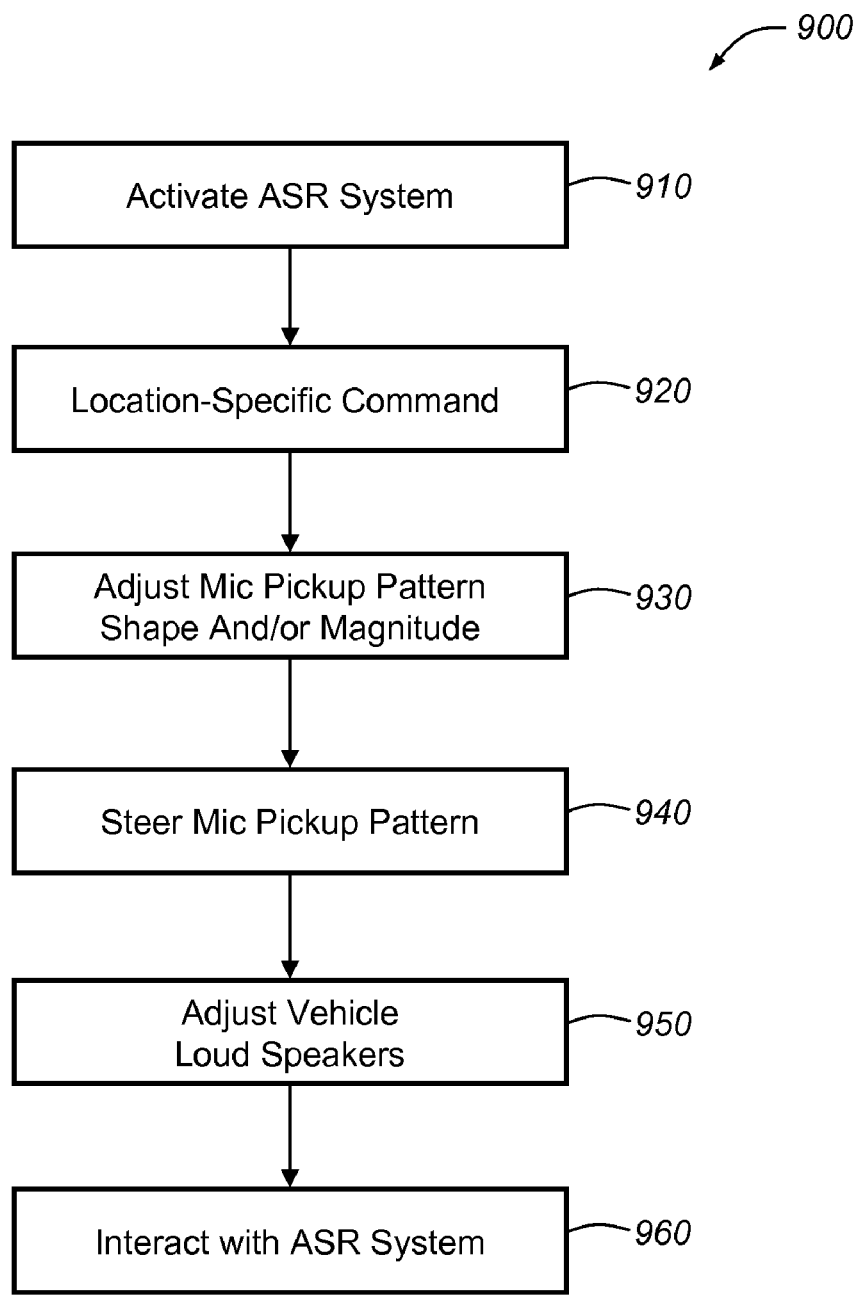
FIG. 9 is a flow chart of an exemplary method of recognizing speech from a plurality of locations within a vehicle.

FIG. 9 illustrates an exemplary embodiment of a method 900 of recognizing speech from a plurality of locations within a vehicle.

At step 910, an ASR system is activated in any suitable manner. For example, the ASR system 210 can be activated by pushbutton or voice command.

At step 920, an ASR system receives a location-specific command from a vehicle occupant that he or she wants to interact with the ASR system. For example, a vehicle occupant can depress a pushbutton associated with a seating position where the occupant is sitting. Each seating position can include such an associated pushbutton. The pushbutton can be suitably communicated with a vehicle control module, such as the telematics unit 114. In another example, a vehicle passenger can speak a voice command into a microphone, wherein the command is representative of the seating location of the particular passenger. For instance, a passenger in a right rear seating location can say "Right Rear Passenger" and a front passenger can say "Front Passenger" and the like. The microphone can be suitably communicated with a vehicle control module, and can be the microphone(s) 132 of the telematics unit 114. The ASR system is in communication with the pushbuttons and microphone(s), recognizes activations of the pushbuttons and recognizes the voice commands, and suitably associates the pushbutton activations and voice commands with the vehicle occupant's particular seating location for further processing. The vehicle occupant who issued the location specific command is identified by the ASR system as a current speaking occupant.

At step 930, the ASR system adjusts a shape and/or magnitude of a pickup pattern of the microphone(s) in response to receipt of the location-specific command from step 920. For example, the ASR system can switch between a plurality of individual microphones from one type of microphone to another. The in-vehicle ASR system could use a cardioid mic to pick up speech from front seating positions, and a hypercardioid mic to pick up speech from rear seating positions. Accordingly, when the ASR system determines that the current speaking occupant is in a rear seating location, the ASR system can switch off the cardioid mic and switch on the hypercardioid mic. Similarly, if the ASR system subsequently determines that a different current speaking occupant is located in a front seating location, the ASR system can switch the hypercardioid mic off and switch the cardioid mic on.

Moreover, a single microphone could be switched between cardioid and hypercardioid modes. Accordingly, FIG. 8A illustrates a pair of electrically actuated acoustic valves 120, 122 disposed in the pairs of front and rear sound ports 116A, 118A, and 116B, 118B for switching between a cardioid and a hypercardioid type of microphone. In particular, the front valve 120 is placed in front port 116B, and rear valve 122 is placed in rear port 118B. The valves 120, 122 selectively permit or retard flow of sound waves through their respective ports to adjust pickup patterns and thereby achieve variable directivity of the microphone 110. Accordingly, when the valves 120, 122 close off their respective ports, the microphone 110 would essentially behave as a cardioid microphone with a pickup pattern like that of FIG. 3. When the valves 120, 122 open their respective ports, then the microphone 110 would essentially behave as a more directional hypercardioid microphone with a pickup pattern like that of FIG. 8. The valves 120, 122 can be opened and closed by any suitable actuator(s) that can be in electrical communication with any suitable vehicle control module, such as the telematics unit 114. The actuators can be small solenoids, servos, or the like.

At step 940, the ASR system steers the microphone(s). For example, a microphone could be oriented or steered to align its pickup pattern with a particular seating position in the vehicle. For example, a single microphone could be electromechanically steered, or an array of microphones (or a single microphone with an array of transducers) could be electronically steered, so that speech is better recognized from a particular location.

In the first example, the microphone could be mounted on an electromechanical actuator such as a rotary actuator, wherein the microphone would have the capability to be steered toward each passenger in the car. The valves would be closed for the front passengers, open for the rear passengers, and the microphone rotated so that the main lobe of the directivity pattern is on axis with whomever is speaking. The electromechanical actuator can be suitably communicated with any suitable vehicle control module, such as the telematics unit 114.

Another way of steering the pickup pattern is to use multiple microphones, which is called a microphone array. For example, at least two microphones having the two pairs of ports 116A, 118A and 116B, 118B and acoustic valves 120, 122 of the hypercardioid microphone 110 can be used. Instead of rotating the microphones, beam-steering technology can be implemented using digital signal processing that will steer main lobes of the microphones to the appropriate passenger. Beam-steering is known to those of ordinary skill in the art and is commonplace in radar systems and increasingly available in microphone and hearing aid systems. Any suitable beam-steering software programs or algorithms can be loaded to any suitable vehicle control module, such as the telematics unit 114.

At step 950, the ASR system adjusts the vehicle loudspeakers to emphasize loudspeaker(s) nearest the current speaking occupant. For example, if the ASR system receives a location-specific command from the right rear passenger, then the ASR system can increase the volume of a loudspeaker associated with the right rear seating location and decrease the volume of the other loudspeakers. In another example, if the ASR system receives a location-specific command from the center rear passenger, then the ASR system can increase the volume of rear loudspeakers and decrease the volume of the front loudspeakers. Any other suitable configuration for adjusting the loudspeakers can be used. The loudspeakers can include any suitable vehicle loudspeakers such as audio system loudspeakers, the loudspeakers 134 of the telematics unit 114, or the like.

At step 960, the current speaking occupant interacts with the ASR system. For example, the current speaking occupant can use telematics services, place a telephone call, navigate the Internet, or the like.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of recognizing speech from a plurality of speaking locations within a vehicle, the method comprising the steps of:

receiving a location-specific command from a vehicle occupant;

adjusting at least one of a shape or magnitude of a pick up mode pattern of a microphone in response to the location-specific command; and switching the pick up mode pattern between cardioid and hypercardioid patterns in response to the location-specific command by using a pair of electrically actuated acoustic valves disposed in two pairs of front and rear sound ports, wherein the valves selectively permit or retard flow of sound waves therethrough to achieve variable directivity of the microphone.

2. The method of claim 1, further comprising:

steering the pick up mode pattern of the microphone in response to the location-specific command.

3. The method of claim 2, wherein the microphone is electromechanically steered.

4. The method of claim 2, wherein the microphone includes a plurality of microphones that are electronically steered.

5. The method of claim 2, further comprising:

adjusting output of at least one loudspeaker in the vehicle in response to the location-specific command.

6. The method of claim 1, further comprising:

adjusting output of at least one loudspeaker in the vehicle in response to the location-specific command.

7. The method of claim 1, wherein the receiving step includes receiving an activation of a pushbutton located at one of a plurality of seating locations.

8. The method of claim 1, wherein the receiving step includes receiving a voice command via the microphone.

9. The method of claim 1, wherein the microphone behaves as a cardioid microphone when the valves close off their respective ports, and behaves as a hypercardioid microphone when the valves open their respective ports.

10. A method of recognizing speech from a plurality of speaking locations within a vehicle, the method comprising the steps of:

receiving a location-specific command from a vehicle occupant, wherein the command is a pushbutton activation or a voice command;

adjusting at least one of a shape or magnitude of a pick up mode pattern of a microphone in response to the location-specific command by switching the pick up mode pattern between cardioid and hypercardioid patterns using a pair of electrically actuated acoustic valves disposed in two pairs of front and rear sound ports, wherein the valves selectively permit or retard flow of sound waves therethrough to achieve variable directivity of the microphone; and steering the pick up pattern of the microphone in response to the location-specific command.

11. The method of claim 10, further comprising the step of adjusting output of at least one loudspeaker in the vehicle in response to the location-specific command.

12. A method of recognizing speech from a plurality of speaking locations within a vehicle, the method comprising the steps of:

receiving a location-specific command from a vehicle occupant, wherein the command is a pushbutton activation or a voice command; and in response to the location-specific command, switching at least one microphone from (a) one type of microphone to another or (b) one microphone mode to another, and steering the pick up pattern of the microphone(s) by electromechanically steering the microphone(s) or electronically steering a plurality of the microphones;

wherein switching the microphone mode further comprises switching between cardioid and hypercardioid modes using a pair of electrically actuated acoustic valves disposed in two pairs of front and rear sound ports, wherein the valves selectively permit or retard flow of sound waves therethrough to achieve variable directivity of the microphone.

\* \* \* \* \*